(12) United States Patent
Faul

(10) Patent No.: US 11,609,431 B2
(45) Date of Patent: Mar. 21, 2023

(54) HEAD-MOUNTED DISPLAY AND AMUSEMENT DEVICE HAVING A HEAD-MOUNTED DISPLAY OF THIS TYPE

(71) Applicant: VR COASTER GMBH & CO. KG, Kaiserslautern (DE)

(72) Inventor: Thomas Faul, Kaiserslautern (DE)

(73) Assignee: VR COASTER GMBH & CO. KG, Kaiserslautern (DE)

( * ) Notice: Subject to any disclaimer, the term of this patent is extended or adjusted under 35 U.S.C. 154(b) by 0 days.

(21) Appl. No.: 17/271,495

(22) PCT Filed: Aug. 30, 2019

(86) PCT No.: PCT/EP2019/073213
§ 371 (c)(1),
(2) Date: Feb. 25, 2021

(87) PCT Pub. No.: WO2020/043879
PCT Pub. Date: Mar. 5, 2020

(65) Prior Publication Data
US 2021/0173217 A1 Jun. 10, 2021

(30) Foreign Application Priority Data
Aug. 30, 2018 (DE) ...................... 10 2018 121 258.5

(51) Int. Cl.
*G02B 27/01* (2006.01)
*G02B 30/25* (2020.01)
(Continued)

(52) U.S. Cl.
CPC ....... *G02B 27/0172* (2013.01); *G02B 5/3025* (2013.01); *G02B 30/25* (2020.01); *G02F 1/133526* (2013.01); *G02F 1/133528* (2013.01)

(58) Field of Classification Search
CPC .. G02B 27/0172; G02B 30/25; G02B 5/3025; G02B 2027/0178; G02B 5/30;
(Continued)

(56) References Cited

U.S. PATENT DOCUMENTS

| 11,054,622 | B1 * | 7/2021 | Gollier | G02B 25/001 |
| 2014/0063055 | A1 * | 3/2014 | Osterhout | G06F 3/165 |
| | | | | 345/633 |

(Continued)

FOREIGN PATENT DOCUMENTS

| JP | 6-242435 A | 9/1994 |
| JP | 8-129157 A | 5/1996 |

(Continued)

OTHER PUBLICATIONS

German office action dated Apr. 25, 2019, for corresponding application DE 10 2018 121 258.5.

(Continued)

*Primary Examiner* — Mariam Qureshi
(74) *Attorney, Agent, or Firm* — Nath, Goldberg & Meyer; Jerald L. Meyer; Stanley N. Protigal

(57) ABSTRACT

The invention relates to a head-mounted display (HMD) (1), comprising a housing (10) having an interior (11), at least one optical lens (15, 17) having a focal plane (5) located at the focal point (16, 18), which focal plane is arranged within the housing (10); at least one first polarizing filter (21) having a first polarization direction and one second polarizing filter (22) having a second polarization direction, and at least one LCD unit (25), wherein the at least one LCD unit (25) is arranged in the area of the focal plane (5) between the first polarizing filter (21) and the second polarizing filter (22); the first polarizing filter (21) and/or the second polarizing filter (22) is or are arranged at a distance from the focal plane (5). The invention further relates to an amusement device (2), in particular an open-air amusement ride, a roller coaster or a carousel, comprising an HMD (1).

8 Claims, 1 Drawing Sheet

(51) Int. Cl.
*G02B 5/30* (2006.01)
*G02F 1/1335* (2006.01)

(58) Field of Classification Search
CPC .......... G02B 2027/0118; G02B 27/017; G02B 27/0101; G02B 2027/012; G02B 2027/0121; G02B 2027/015; G02F 1/133526; G02F 1/133528; B60R 2300/205; G03B 21/604
See application file for complete search history.

(56) References Cited

U.S. PATENT DOCUMENTS

| | | |
|---|---|---|
| 2018/0180889 A1* | 6/2018 | Lee .................... G02B 27/0172 |
| 2018/0181196 A1 | 6/2018 | Lee et al. |
| 2018/0239146 A1 | 8/2018 | Bierhuizen et al. |
| 2019/0049733 A1* | 2/2019 | Jiang .................. G02B 17/0856 |
| 2019/0321735 A1* | 10/2019 | Zamperla ............... A63G 31/16 |

FOREIGN PATENT DOCUMENTS

| | | |
|---|---|---|
| JP | 9-127429 A | 5/1997 |
| JP | 2001-311908 A | 11/2001 |
| JP | 2006-197435 A | 7/2006 |
| JP | 2009-157291 A | 7/2009 |
| JP | 2015-504616 A | 2/2015 |
| WO | 2017/193043 A1 | 11/2017 |

OTHER PUBLICATIONS

Office Action dated Feb. 8, 2022, in corresponding Japanese application No. 2021-500145, with English translation.
Office Action dated Jul. 5, 0222, in corresponding Japanese application No. 2021-500145.

* cited by examiner

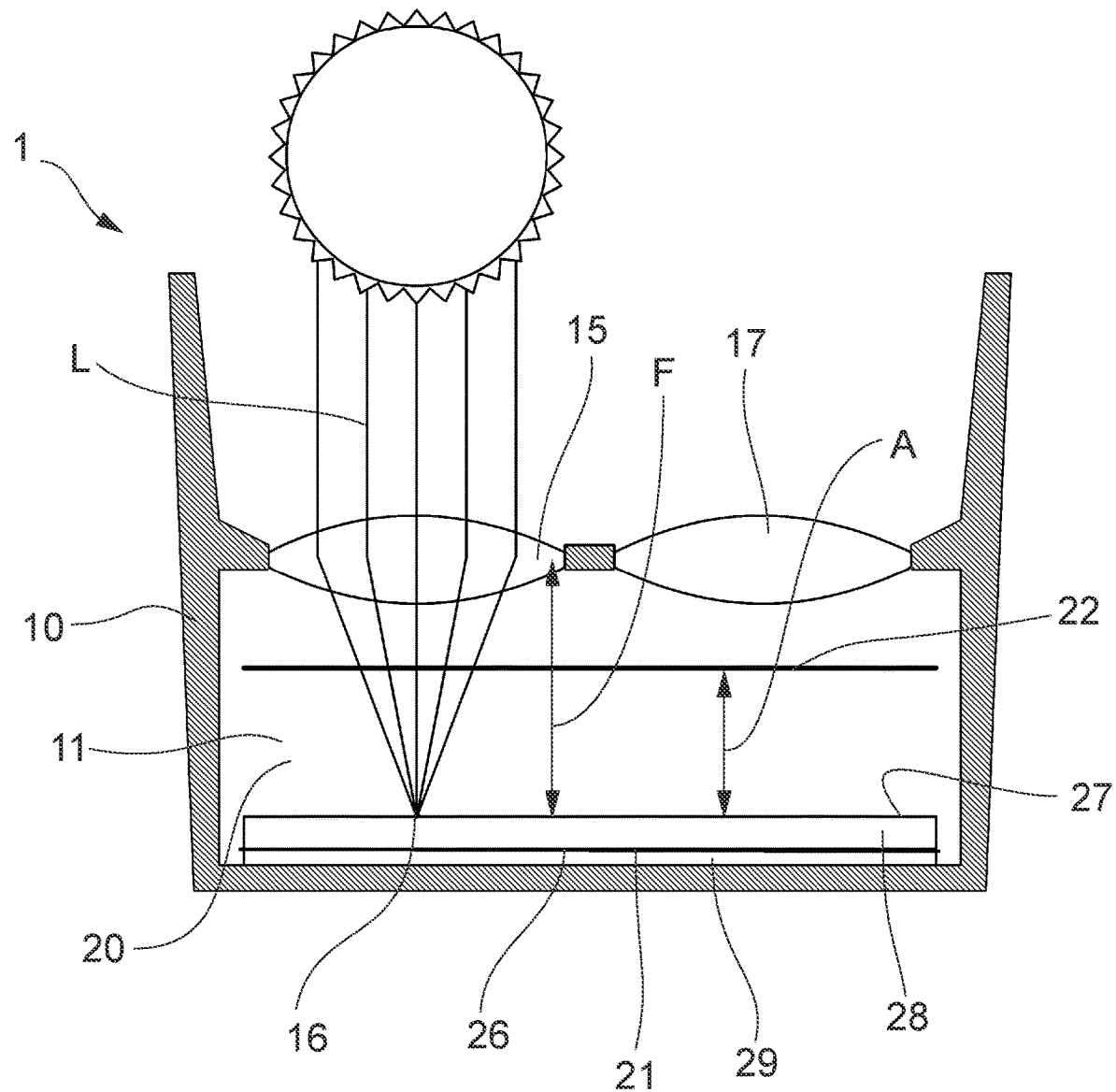

HEAD-MOUNTED DISPLAY AND AMUSEMENT DEVICE HAVING A HEAD-MOUNTED DISPLAY OF THIS TYPE

CROSS-REFERENCE TO RELATED APPLICATIONS

This is a National Phase Application filed under 35 U.S.C. 371 as a national stage of PCT/EP2019/073213 filed Aug. 30, 2019, an application claiming the benefit of German Application No. 10 2018 121 258.5 filed Aug. 30, 2018, the content of each of which is hereby incorporated by reference in its entirety.

FIELD

The present invention relates to a head-mounted display (HMD), which has improved properties for indoor and outdoor use and an improved resistance to radiation from natural sunlight. In addition, the present invention relates to an amusement device, in particular an open-air amusement ride, a roller coaster or a carousel, having at least one such head-mounted display.

BACKGROUND

Head-mounted displays, hereinafter referred to as HMDs, are known from prior art in various configurations and are used to display artificially generated representations in the user's field of vision. For this purpose, the HMDs can be positioned or attached to the head and in front of a person's eyes, wherein the image can cover as large an area as possible in the person's field of vision. This type of display device is used primarily in the field of VR glasses to generate virtual reality. In this case, the representation of virtual reality can also be adapted in real time on the basis of the position and/or the orientation of the VR glasses synchronously with the head movement of the person. The optical reality can also be recorded by a camera and enhanced in the display of the HMD by importing augmented reality effects.

HMDs typically include a housing with an interior. In the interior there is either a two-part display unit or two display units, the representation of which can be captured by the person through one optical lens per eye. Each display unit typically comprises a backlight, a first polarizer, an LCD unit and a second polarizer. The LCD unit comprises two electrodes, which are arranged on the respective opposite sides in each case and by which the liquid crystal located between the electrodes can be influenced in such a way that the polarization of the light radiating through the liquid crystal is rotated.

Depending on the polarization of the light emerging through the LCD unit, light rays from the backlight can emerge through the second polarizing filter and can accordingly be perceived by the person's eyes.

The use of such HMDs has proven itself in prior art. In particular for the use of HMDs, a large number of applications have been developed which, for example, increase the experience value of amusement devices, in particular open-air amusement rides, roller coasters, carousels or the like. Such amusement devices are often located outside of enclosed spaces, exposing the HMDs to all kinds of environmental conditions. In addition to a large possible temperature range, the HMDs must be dust- and moisture-tight in order to enable a VR experience in an amusement device in all weather conditions.

It has been found to be a disadvantage that the HMDs known from prior art, especially when they are used outside of enclosed spaces, but also when they are stored inside behind a window and thus exposed to sunlight, suffer damage in the form of permanent light spots on the display unit. It has been found that when HMDs are placed in the area of irradiating sunlight, the light penetrates through the optical lenses into the interior of the housing of the HMD and destroys the display unit. The sunlight is focused by the optical lens and strikes the display unit in a concentrated manner in the area of the focal point, which is destroyed as a result of the heat.

SUMMARY

This is where the present invention starts.

The invention is based on the objects of providing an improved HMD, which expediently eliminates the disadvantages of the HMDs known from prior art and is suitable for outdoor use, in particular for amusement devices, roller coasters and carousels, but also for indoor use at home. The HMD according to the invention should be insensitive to direct sunlight. Sun rays typically enter the HMD whenever a person, for example a passenger of an amusement device, puts on or takes off the HMD before or after the experience in an amusement device, but also when the HMD is placed indoors in front of a window or in a space with a high light intensity.

The HMD according to the invention comprises a housing having an interior, at least one optical lens having a focal plane located at the focal point, which focal plane is arranged within the housing, at least one first polarizing filter having a first polarization direction and one second polarizing filter having a second polarization direction and at least one LCD unit, wherein the at least one LCD unit is arranged in the area of the focal plane between the first polarizing filter and the second polarizing filter and wherein the first polarizing filter and/or the second polarizing filter are arranged at a distance from the focal plane or the LCD unit and is or are thermally decoupled.

The HMD according to the present invention is based on the surprising finding that the incoming light rays are focused by the optical lens and do not destroy the LCD unit, but only the first polarizing filter and/or the second polarizing filter is or are damaged by the effects of heat. Accordingly, the HMD according to the invention is based on the measure of arranging the first polarizing filter and/or the second polarizing filter at a distance from the focal plane located at the focal point. As a result, the thermal load resulting from the incoming light rays is reduced to such an extent that the HMD can be exposed to sunlight without damage and without hindrance.

A further advantageous design of the present invention provides that a trend column is arranged between the LCD unit and the first polarizing filter and/or the second polarizing filter. The trend column is used for the thermal and/or mechanical decoupling of the first polarizing filter and/or the second polarizing filter. As a result, on the one hand, a sufficient distance is set between the first polarizing filter and/or the second polarizing filter to the focal plane of the optical lens and, on the other hand, heat transfer between the LCD unit and the relevant polarizing filter is reduced. The trend column is particularly preferably filled with a gaseous medium, the entire interior of the housing being particularly preferably filled with the gaseous medium. The medium is more preferably a non-reactive gas, whilst a purified gas, a technical gas or a gas mixture is preferred.

According to a further preferred design of the present invention it is provided that the at least one second polarizing filter is arranged between the at least one LCD unit and the at least one optical lens, the distance between the at least one LCD unit and the at least one second polarizing filter being at least ½₅ of the distance between the at least one LCD unit and the at least one optical lens, or the focal length of the optical lens. It has been found that even a slight distance between the focal length of the optical lens and the polarizing filter is sufficient to reduce the thermal effect of the rays entering through the lens on the polarizing filter without affecting the representation of the displayed image perceived by the person wearing the HMD.

It has been found to be advantageous if the at least one second polarizing filter is arranged on the side of the at least one optical lens facing the at least one LCD unit. For this purpose, the second polarizing filter can be applied or arranged directly on the optical lens or, alternatively, can be arranged within the optical lens. In particular, it has proven to be advantageous if the polarizing filter is arranged between the at least one optical lens and the LCD unit equidistant from the optical lens in order to avoid refractions of light. The light rays passing through the optical lens therefore hit or pass the polarizing filter at right angles.

Another advantageous embodiment of the present invention provides that the first polarization direction of the first polarizing filter and the second polarization direction of the second polarizing filter are not the same. It is particularly preferred if the first polarizing filter and the second polarizing filter are linear polarizing filters and the first polarization direction is oriented perpendicular to the second polarization direction.

It has proven to be advantageous, in particular for the use of amusement devices in outdoor spaces or outdoors, if the interior of the housing is closed by the at least one optical lens. According to the invention, the HMD should be sufficient against both splash water, e.g. be protected from rain and dust, and can be disinfected or cleaned in a simple cleaning process for reuse in the amusement device. On the one hand, a prompt hygienically safe reuse in an amusement device can thus be achieved and, on the other hand, no foreign bodies that negatively affect the representation produced can get into the interior of the housing.

It is particularly advantageous if the housing for outdoor use corresponds at least to the IP4X standard, with a higher protection standard than IP4X against foreign bodies being particularly preferred. It is preferred if the protection standard corresponds to at least IP6kX. Furthermore, it is particularly advantageous if the HMD for outdoor use corresponds at least to the protection class against water IPX4, more preferably at least IPX4k and more preferably IPX6.

Another aspect of the present invention relates to an amusement device, in particular an open-air amusement ride, a roller coaster or a carousel, but also an amusement device for home use, indoors and outdoors, with at least one HMD, the HMD preferably being used as VR glasses, and a housing having an interior, at least one optical lens with a focal plane located at the focal point, which focal plane is arranged within the interior of the housing. In addition, the HMD has at least one first polarizing filter with a first polarization direction and a second polarizing filter with a second polarization direction and at least one LCD unit, the at least one LCD unit being arranged in the area of the focal plane between the first polarizing filter and the second polarizing filter and wherein the first polarizing filter and/or the second polarizing filter is or are arranged spaced apart and thermally decoupled from the focal plane. The amusement device with the HMD according to the invention can be operated particularly economically, since the expected service life of an HMD according to the invention is significantly increased and, thanks to the corresponding design of the HMD, it can be cleaned or disinfected economically and hygienically after use in the amusement devices, so that it can be quickly reused in the amusement devices.

According to a further advantageous design of the present invention, it is provided that the HMD is connected to the amusement device by means of a wired and/or wireless interface, the amusement device having a central or a plurality of decentralized data processing systems that generates or generate a virtual reality displayed in the particular HMD. It is particularly advantageous if the amusement device according to the invention comprises means by which the HMDs can be cleaned or disinfected after use by a passenger.

BRIEF DESCRIPTION OF THE DRAWINGS

An embodiment example according to the invention is explained in detail below with reference to the accompanying drawings. In the drawings:

FIG. 1 shows a schematic, partially sectioned representation of a head-mounted display (HMD) which is designed for the stereographic representation of a virtual reality.

DETAILED DESCRIPTION

FIG. 1 shows a schematic representation of a head-mounted display 1, hereinafter referred to as HMD 1, which is set up to be placed on a person's head (not shown). The HMD 1 can, for example, be VR glasses and replace the optical reality in the person's current field of vision with a preferably stereoscopic representation of a more preferably artificially generated representation, a so-called virtual reality.

For this purpose, the HMD 1 comprises a housing 10, which can be fastened to the head or body of the person, for example by fastening means (not shown) and is positioned in front of the person's eyes in such a way that their field of vision is completely covered by the housing 10.

The housing 10 is preferably designed in the shape of a pot and comprises two optical lenses 15, 17, which are each assigned to one eye of the person. The housing 10 encloses an interior 11, which is sealed against foreign bodies, in particular dust and water, in particular splash water or rain, by the two optical lenses 15, 17.

In the embodiment example shown, the two optical lenses 15, 17 are converging lenses, each having a focal point 16, 18 lying on a focal plane 5, which are arranged on the side of the interior 11 of the housing 10 facing the interior 11.

In the interior 11 of the housing 10, at least one first polarizing filter 21 with a first polarization direction, an LCD unit 25, a second polarizing filter 22 with a second polarization direction and a backlight 29 are provided, protected from the environment, wherein the light rays L emitted by the backlight 29 first reach the first polarizing filter 21 and irradiate the LCD unit 25 and the second polarizing filter 22 before they can reach the optical lens 15, 17. The first polarizing filter 21 and the second polarizing filter 22 are linear polarizing filters and the first polarization direction and the second polarization direction are rotated with respect to one another, the first polarization direction being preferably rotated by 90° with respect to the second polarization direction.

While the backlight 29 emits non-polarized light, the light emitted by the backlight 29 first flows through the first polarizing filter 21, which linearly polarizes the light in one polarization direction. This is followed by the LCD unit 25, which consists of a first electrode 26 and a second electrode 27, with a liquid crystal 28 being arranged between the first electrode 26 and the second electrode 27, which crystal rotates the polarization plane of the light in dependence on the energization of the first and second electrode 26, 27, so that the polarization of the light can be influenced depending on the energization of the electrodes 26, 27 and it can be set whether or not light penetrates the second polarizing filter 22.

To ensure that the representation produced for the person can be perceived with sufficient sharpness, the LCD unit 25 must be arranged in the area of the focal point 16, 18 of the relevant optical lens 15, 17.

In the embodiment example shown in FIG. 1, the first polarizing filter 21 is arranged directly adjacent to the LCD unit 25 on the side facing the backlight 29. In contrast, the second polarizing filter 22 is arranged at a distance from the LCD unit 25 and the focal plane 5. A trend gap 20 is formed between the LCD unit 25 and the second polarizing filter 22, by means of which the second polarizing filter 22 is thermally and mechanically decoupled from the LCD unit 25. The thermal decoupling prevents heat from being transferred between the LCD unit 25 and the second polarizing filter 22 through a high thermal resistance.

The trend gap 20 between the second polarizing filter 22 and the LCD unit 25 can be filled by a medium (not shown), which is particularly preferably a gaseous medium. The medium is more preferably a non-reactive gas or a gas mixture with low thermal conductivity.

The distance A between the focal plane 5 or the LCD unit 25 and the second polarizing filter 22 is preferably at least $1/25$ of the focal length F, i.e. the distance between the focal plane and the relevant optical lens 15, 17, wherein the distance A between the focal plane 5 and the second polarizing filter 22 can be designed as large as desired. Accordingly, A should be $\geq 1/25*F$.

For example, it can be provided that the second polarizing filter 22 is also arranged directly on the side of the optical lens 15, 17 facing the LCD unit 25. It is particularly preferred if the second polarizing filter 22 is designed in such a way that the light rays L passing through the optical lens 15, 17 always pass perpendicularly through the second polarizing filter 22, as a result of which refraction of light is reduced. This is achieved in particular when the second polarizing filter 22 has a curvature corresponding to the optical lens 15, 17.

The HMD 1 can comprise a suitable sensor system, by means of which the movements of the person or the movements of the head of the person can be detected. In addition, the HMD 1 can have a wireless and/or wired interface through which the HMD 1 can be connected to a data processing system of the amusement device 2, which system generates a virtual reality. In accordance with the present invention, the data processing system can particularly preferably generate an amusement-device-specific virtual reality, which is reproduced on the corresponding HMD.

LIST OF REFERENCE NUMERALS

1 HMD
2 Amusement device
5 Focal plane
10 Housing
11 Interior
15 Lens
16 Focal point
17 Lens
18 Focal point
20 Trend gap
21 First polarizing filter
22 Second polarizing filter
25 LCD unit
26 First electrode
27 Second electrode
28 Liquid crystal
29 Backlight
A Distance
F Focal length of 15, 17
L Light ray

The invention claimed is:

1. A helmet mounted display (HMD) (1) having:
a housing (10) with an interior (11),
at least one optical lens (15, 17) with a focal plane (5) located in the interior (11) of the housing (10) at a focal point (16, 18);
at least one first linear polarizing filter (21) with a first polarization direction and a second linear polarizing filter (22) with a second polarization direction, the first linear polarizing filter having a polarization direction oriented perpendicular to the second polarization direction; and
at least one LCD unit (25),
wherein the at least one LCD unit (25) is arranged in the area of the focal plane (5) between the first linear polarizing filter (21) and the second linear polarizing filter (22),
wherein the first linear polarizing filter (21) and the second linear polarizing filter (22) are arranged at a distance from the focal plane (5) in a manner so as transmit the light therethrough as linearly polarized light without conversion to circularly polarized light,
and wherein the second linear polarizing filter (22) is within the optical lens (15, 17), or the second linear polarizing filter (22) has a curvature corresponding to the optical lens (15, 17) and configured in such a way that the light rays L passing through the optical lens (15, 17) pass perpendicularly through the second linear polarizing filter (22) so as to transmit the linearly polarized light.

2. The HMD (1) according to claim 1, characterized in that a separating gap (20) is arranged between the LCD unit (25) and the first linear polarizing filter (21) and/or the second linear polarizing filter (22).

3. The HMD (1) according to claim 1, characterized in that the second linear polarizing filter (22) is arranged on the side of the at least one optical lens (15, 17) facing said at least one LCD unit (25).

4. The HMD (1) according to claim 1, characterized in that a backlight (29) is arranged on a side of the LCD unit (25) facing away from the optical lens (15, 17).

5. The HMD (1) according to claim 1, characterized in that the interior (11) of the housing (10) is closed by the at least one optical lens (15, 17).

6. The HMD (1) according to claim 1, characterized in that the HMD (1) has at least a protection class IP4X against foreign bodies and/or a protection class against water of at least IPX4.

7. An amusement device (2), in particular an open-air amusement ride, a roller coaster or a carousel, with at least one HMD (1) according to claim 1.

8. The amusement device (2) according to claim 7, characterized in that the HMD (1) is connected to the amusement device (2) via a wired interface, or that the HMD (1) is connected to the amusement device (2) via a wireless interface.

\* \* \* \* \*